US008634331B2

(12) United States Patent
Freeman et al.

(10) Patent No.: US 8,634,331 B2
(45) Date of Patent: Jan. 21, 2014

(54) CUSTOMER PREMISES CALL HANDLING

(75) Inventors: Karen Freeman, Toronto (CA); David Robert Macphie, Toronto (CA); Nasahn Adam Sheppard, Mill Valley, CA (US); Jason Edward Short, San Francisco, CA (US); Stephan Georgiev, St-Hubert (CA)

(73) Assignee: BCE Inc., Quebec (CA)

( * ) Notice: Subject to any disclaimer, the term of this patent is extended or adjusted under 35 U.S.C. 154(b) by 1469 days.

(21) Appl. No.: 12/020,047

(22) Filed: Jan. 25, 2008

(65) Prior Publication Data
US 2009/0190742 A1  Jul. 30, 2009

(51) Int. Cl.
*H04Q 11/00* (2006.01)
*H04M 3/533* (2006.01)
*H04L 12/58* (2006.01)

(52) U.S. Cl.
CPC ............... *H04M 3/533* (2013.01); *H04L 51/10* (2013.01); *H04L 51/22* (2013.01)
USPC ....................................................... 370/260

(58) Field of Classification Search
None
See application file for complete search history.

(56) References Cited

U.S. PATENT DOCUMENTS

| | | | | |
|---|---|---|---|---|
| 5,193,110 A | * | 3/1993 | Jones et al. | 379/88.16 |
| 5,636,218 A | * | 6/1997 | Ishikawa et al. | 370/260 |
| 5,978,451 A | | 11/1999 | Swan et al. | |
| 6,058,178 A | | 5/2000 | McKendry et al. | |
| 6,081,707 A | * | 6/2000 | Christensen et al. | 455/413 |
| 6,263,071 B1 | | 7/2001 | Swan et al. | |
| 6,407,997 B1 | * | 6/2002 | DeNap et al. | 370/494 |
| 6,597,764 B1 | | 7/2003 | Haze | |
| 6,778,661 B1 | * | 8/2004 | Yumoto et al. | 370/270 |
| 6,826,173 B1 | * | 11/2004 | Kung et al. | 370/261 |
| 6,831,899 B1 | * | 12/2004 | Roy | 370/260 |
| 7,706,817 B2 | * | 4/2010 | Bamrah et al. | 455/466 |
| 7,782,854 B2 | * | 8/2010 | Sakata et al. | 370/469 |
| 2003/0161454 A1 | | 8/2003 | Nassimi | |
| 2004/0022208 A1 | * | 2/2004 | Dahod et al. | 370/328 |
| 2004/0196833 A1 | * | 10/2004 | Dahan et al. | 370/493 |
| 2004/0213401 A1 | | 10/2004 | Aupperle et al. | |
| 2005/0100152 A1 | | 5/2005 | Pearson | |
| 2005/0147086 A1 | * | 7/2005 | Rosenberg et al. | 370/270 |
| 2005/0207556 A1 | | 9/2005 | Gonzalez et al. | |
| 2006/0026277 A1 | | 2/2006 | Sutcliffe | |

(Continued)

OTHER PUBLICATIONS

Non-Final Office Action issued by the U.S. Patent and Trademark Office on Oct. 31, 2011 in connection with U.S. Appl. No. 12/344,007, (12 pages).

*Primary Examiner* — Jeffrey M Rutkowski
(74) *Attorney, Agent, or Firm* — Finnegan, Henderson, Farabow, Garrett & Dunner, LLP

(57) ABSTRACT

A computer readable storage medium holding a program element for execution by a processor for processing voice calls. The program element comprises an input interface to receive at a customer premises a signal carrying a call request indicative of an incoming voice call, wherein the call request includes a call destination identifier. Also present, a processing element at a customer premises coupled to the input interface. The processing element processes the call destination data to distinguish the call destination identifier from other call destination identifiers that the signal can carry. The processing element also processes the call request to select a handset to which the incoming call is to be linked on the basis of the call destination identifier and links the voice call to the handset. Also provided are a telephone system and method and a telephone system and method involving forwarding calls to voice mail services.

16 Claims, 6 Drawing Sheets

(56) References Cited

U.S. PATENT DOCUMENTS

| | | | |
|---|---|---|---|
| 2006/0062358 A1* | 3/2006 | Pearson et al. | 379/88.2 |
| 2006/0067502 A1* | 3/2006 | Bamrah et al. | 379/211.02 |
| 2006/0274721 A1* | 12/2006 | Flanagan | 370/352 |
| 2008/0125095 A1* | 5/2008 | Mornhineway et al. | 370/259 |
| 2008/0192657 A1* | 8/2008 | Vagelos | 370/261 |
| 2008/0299950 A1* | 12/2008 | Wu et al. | 455/413 |

* cited by examiner

CUSTOMER PREMISES CALL HANDLING

FIELD OF THE INVENTION

The present invention relates to telephony solutions and, in particular, to customer premises call handling.

BACKGROUND

In the past, certain local telephone service providers have offered a differentiated ringing service for households wanting to have two numbers on the same line. With this service, two different telephone numbers were associated to a same telephone line and all the phones at the customer premises rang either one of two ways, depending on the phone number called. Thus, when a caller dialed the first number, all the phones in the household ring one way and when the caller dialed the second number, all the phones rang a second, slightly different way.

While this service allowed users in a household to identify without picking up the intended recipient of incoming phone calls, it does not allow a user to avoid getting disturbed by telephone calls not intended for them. However, it is well known that different users in a household, workplace, or other premises may have vastly varying phone usage habits/requirements. Yet it can be very frustrating for a user to be constantly disturbed by phone calls intended for another user, particularly when he/she cannot allow himself to unplug the telephone for fear of missing an important call.

Today, POTS home telephony is being replaced by VoIP alternatives. VoIP systems provide users with home telephone systems analogous to POTS telephony but using packet-based networks such as the Internet instead of analog POTS networks for communicating. Advantageously, VoIP offers a number of options not available, or costly, on POTS systems and VoIP allows for data communication to supplement voice communication. As a result, VoIP systems tend to be more flexible and can do more than POTS-type telephony systems.

There is a need in the industry for a telephony system that mitigates at least one disadvantage of the prior art.

SUMMARY OF THE INVENTION

In accordance with a first broad aspect, the present invention provides a computer readable storage medium holding a program element for execution by a processor to implement a system for processing voice calls directed to a connection leading to a customer premises. The program element comprises an input interface to receive at a customer premises a signal over the connection carrying a call request indicative of an incoming voice call, wherein the call request includes call destination data conveying a call destination identifier. The program element further comprises a processing element at a customer premises coupled to the input interface. The processing element processes the call destination data to distinguish the call destination identifier currently conveyed in the signal from other call destination identifiers that the signal can carry over the connection. The processing element also processes the call request to select a handset among a set of handsets to which the incoming call is to be linked on the basis of the distinguished call destination identifier. The processing element also links the voice call to the selected handset.

In accordance with a second broad aspect, the present invention provides a method for processing voice calls directed to a connection leading to a customer premises. The method comprises the step of receiving at a customer premises a signal over the connection carrying a call request indicative of an incoming voice call, wherein the call request includes call destination data conveying a call destination identifier. The method further comprises the step of processing the call request at customer premises to distinguish the call destination identifier currently conveyed in the signal from other call destination identifiers that the signal can carry over the connection. The call request is also processed to select a handset among a set of handsets to which the incoming call is to be linked on the basis of the distinguished call destination identifier. The method also comprises the step of linking the voice call to the selected handset.

In accordance with a third broad aspect, the present invention provides a method for processing voice calls directed to a connection leading to a customer premises. The method comprises receiving at the customer premises a signal over the connection carrying a call request indicative of an incoming voice call, wherein the call request includes call destination data conveying a call destination identifier. The method further comprises processing the call destination data to distinguish the call destination identifier currently conveyed in the signal from other call destination identifiers that the signal can carry over the connection. The method still further comprises processing the call request at the customer premises to select a voice mail service among a set of voice mail services to which the incoming call is to be forwarded on the basis of the distinguished call destination identifier. The method also comprises processing the call request at the customer premises to cause the voice call to be forwarded to the selected voice mail service.

In accordance with a fourth broad aspect, the present invention provides a telephone system. The telephone system comprises a set of handsets at a customer premises. The telephone system further comprises a base station at a customer premises. The base station has an input for connection to a connection leading to a customer premises, wherein the connection is capable of carrying voice calls. The base station also has an input interface to receive a signal over the connection carrying a call request indicative of an incoming voice call, wherein the call request includes call destination data conveying a call destination identifier. The telephone system also comprises a processing element at a customer premises coupled to the input interface. The processing element processes the call destination data to distinguish the call destination identifier currently conveyed in the signal from other call destination identifiers that the signal can carry over the connection. The processing element further processes the call request to select a handset among the set of handsets to which the incoming call is to be linked on the basis of the distinguished call destination identifier. The processing element still further links the selected handset to the incoming call.

In accordance with a fifth broad aspect, the present invention provides a telephone system. The telephone system comprises a set of handsets at a customer premises. The telephone system further comprises a base station at a customer premises. The base station has an input for connection to a connection leading to a customer premises, wherein the connection is capable of carrying voice calls. The base station further has an input interface to receive a signal over the connection carrying a call request indicative of an incoming voice call, wherein the call request includes call destination data conveying a call destination identifier. The telephone system also has a set of voice mail services. The telephone system still further has a processing element at a customer premises coupled to the input interface. The processing element processes the call destination data to distinguish the call destination identifier from other call destination identifiers that the signal can carry over the connection. The processing element further processes the call request to select a voice mail service among the set of voice mail services at which the incoming call is to be forwarded on the basis of the distinguished call destination identifier. The processing element still further forwards the incoming voice call to the selected voice mail service.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided herein below with reference to the following drawings, in which.

DETAILED DESCRIPTION

Figure 1:
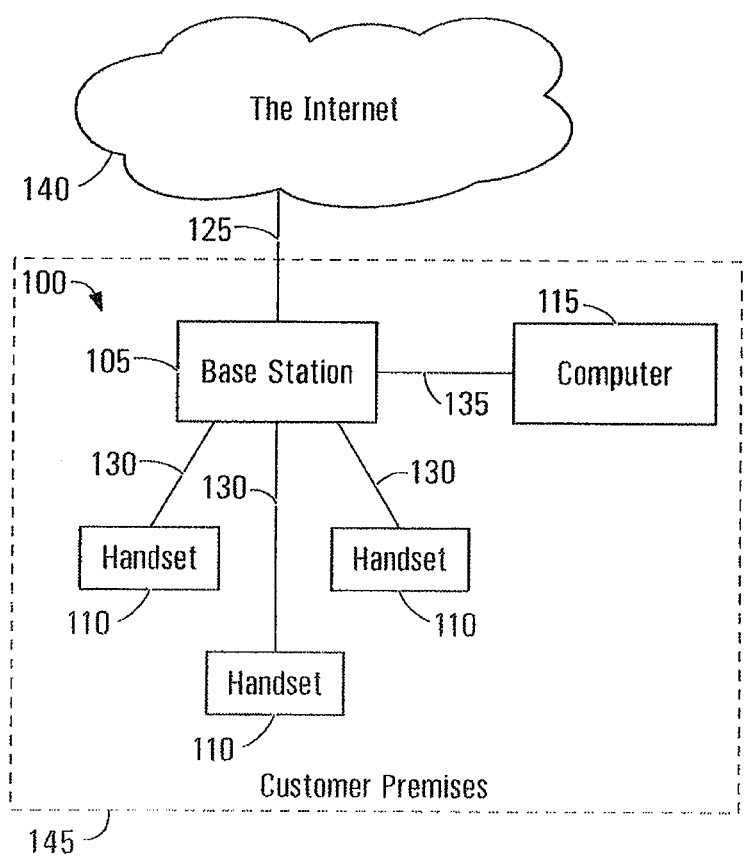
FIG. 1 is a block diagram of a customer premises telephony system in accordance to a non-limiting embodiment.

FIG. 1 shows a telephony system in accordance with a non-limiting example of implementation of the invention. A customer has, at customer premises 145, a plurality of handsets 110 connected to a base station 105. Base station 105 has a packet-based connection 125 for connecting to a network 140 (a packet based network) and exchanging telephony data therewith. The packet based connection 125 can be wireline (ex. cable, DSL, etc.) or wireless (ex. WiMax, EDGE, EVDO, CDMA, GSM etc.). Handsets 110 have respective handset connections 130 to base station 105 for exchanging telephony data therewith. Optionally, the base station 105 is in communication with a computer 115 via a local area network (LAN) connection 135. The connections 130 may be wireless but they could be wireline or a combination of both.

Figure 2:
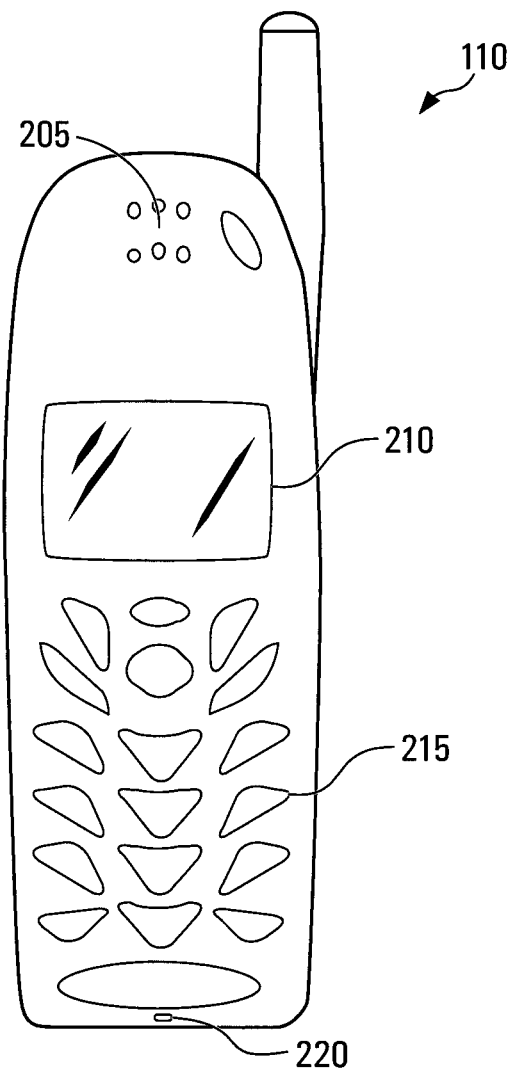
FIG. 2 shows a handset for use in the system of FIG. 1 in accordance to a non-limiting example of implementation of the invention.

Handset 110 can be any suitable user telephony interface but in the example illustrated in FIG. 2, handset 110 is a wireless telephone having a display screen 210, a keypad 215, a speaker 205 and a microphone 220. Handset 110 includes a communication module (not shown) for communicating with base station 105 over handset connection 130. In some embodiments, handset 110 communicates with base station 105 using the Digital Enhanced Cordless Telecommunications (DECT) protocol. In these embodiments, handset 110 does not need to be connected to a physical RJ11 or other phone jack. If handset 110 has a docking station, it needs only be a charger connected to a power outlet. In a non-limiting example, the base station 105 acts as an analog telephony adapter (ATA) and serves as a gateway for packet based telephony. Base station 105 may thus translate telephony information exchanged between packet based link 125 and handsets 110 as required. As such, the handsets 110 need not include VoIP-specific support but may be any handset communicating with base station 105 in any known manner. Therefore, it is to be understood that handset 110 may also be a POTS phone. One skilled in the art will appreciate that there are many possible configurations of handset 110 that can be used without departing from the intended scope of the invention. For example, handset 110 may have a very sophisticated display screen with a touch-screen input or may have a basic dot-matrix screen or no display screen at all. Likewise, although handset 110 is described here as communicating over the DECT protocol, this is not necessarily the case and any communication means, wired or wireless, can be used as a connection to base station 105. While handset 110 has been shown here in a specific embodiment, any handset 110 known in the art can be used and handset 110 can therefore be a fax machine.

Figure 3:
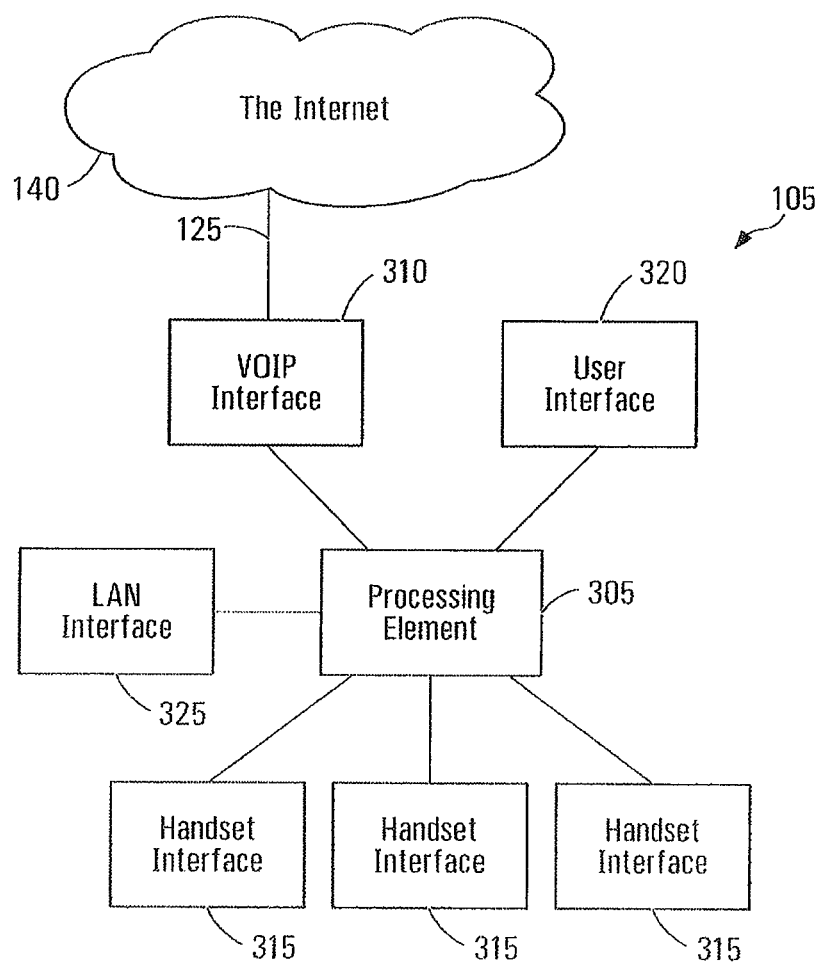
FIG. 3 shows a block diagram of the base station used in the system shown in FIG. 1.

FIG. 3 shows a block diagram representation of base station 105 in accordance with a non-limiting example of implementation of the invention. Here, base station 105 has a packet based interface 310 for exchanging packeted telephony information over a packet-based network 140, such as the Internet. Packet based connection 125 may be an IP connection or any other suitable connection. Likewise, network 140 may be any suitable network including a public packet based network (e.g. the Internet), a private packet based network or any combination of public and private networks.

Base station 105 also has a plurality of handset interfaces 315 for interfacing with respective handsets 110. Handset interfaces 315 may be suitable for permitting wireless or wireline exchanges with handsets 315. Alternatively, a single handset interface may be provided to handle the communications between the base station 105 and the handsets 110. For instance, a single handset interface 315 for communicating with all handsets 110 over, e.g., a single frequency may be utilized; with specific handsets 110 being addressed by an appropriate means such as by a handset-specific ID.

Furthermore, base station 105 further has a user-interface 320 that allows a user to interface with base station 105 such as to change settings. The user interface may have a display (not shown) and an input mechanism allowing the user to input commands and/or data. The input mechanism can be a keyboard and/or a pointing device. Alternatively, speech recognition or touch sensitive surfaces can be used. The input mechanism can include a limited set of keys to fit space restrictions (for instance, if the base station 105 is physically small) while allowing the user to input all the necessary commands. Another possibility is to provide soft keys that may use part of the display to identify their purpose or function.

Processing element 305 controls interfaces 310, 315, 320, 325 and handles incoming calls in the manner described below.

Base station 105 may be implemented by any suitable means. In a non-limiting example, base station 105 has a dedicated hardware comprising a processor and a memory with computer-readable storage medium holding a program element for execution by the processor to implement the functionality of the system described herein. However, base station 105 may also be implemented by software (program element) for execution by a general-purpose computer, such as a customer's personal computer. One skilled in the art will appreciate that base station 105 may also be implemented by dedicated circuitry behaving in the manner described below.

Packet based interface 310 is provided mainly to establish and maintain the packet based connection 125 with a remote node of the network 140. The packet based interface 310 sends and receives packeted telephony data over packet-based connection 125. Telephony data includes voice information and optionally any other data such as, video information (video conferencing) and messaging. Telephony data also includes control and signaling data for example to establish telephone calls, monitor quality of service (QoS) and ensure synchronization. Thus, in a non-limiting example of implementation, telephony data includes SIP or H.323 based exchanges.

As mentioned above, Base station 105 may act as an ATA or otherwise be a translator between packet based connection 125 and handset 110. To this end, base station 105 may include a packetizer/depacketizer, encoders/decoders (codecs) and/or an analog-to-digital converter (or vice versa) to transform telephony information exchanged between handsets 110 and packet based connection 125 as required. One skilled in the art will readily appreciate that many translation schemes are possible (the choice of which may depend at least in part on the nature of the packet based connection 125 and of the handset connection 130) all of which are within the intended scope of the invention. For example, incoming telephony information may be decoded and digital-to-analog converted or be decoded and re-encoded differently or may even be exchanged between handsets 110 and packet based connection 125 unaltered. In the latter case, base station 105 may still transform information received over packet based connection 125 in order to analyze it.

Optionally, base station 105 will include a LAN interface 325 for exchanging data with a computer 115 at customer premises 145. In a non-limiting embodiment, base station 105 serves as a modem or main connection to the Internet for customer premises 145. In this example, a customer may have one or many computers 115 linked via local area network 135 to base station 105. Here packet based interface 310 may also serve as a generic data connection to a network through which computer data, as well as telephony data, is exchanged.

In a non-limiting embodiment, a customer (e.g. a VoIP telephony account holder, a household) may have several call destinations (and, optionally, recipients) associated with his telephony account, each having a different identifier such as telephone number, e-mail address or IP address. When a call is placed to customer premises 145, base station 105 receives a call request. The call request may be in any suitable format such as messaging packets but in a non-limiting embodiment, the call request may be in the form of a SIP invite. The call request may contain call destination data indicative of a call destination indicated by the originator of the call. In a non-limiting embodiment, call destination data includes a label uniquely identifying a call destination such as a telephone number, an e-mail address, an IP address, or a unique customer ID. In a non-limiting example of implementation, the call request is received by packet based interface 310 and is forwarded to the processing element 305 that distinguishes the call destination data contained therein from amongst a plurality of call destination data that may be received over packet based connection 125. For example, processing element 305 might be adapted to determine which telephone number, from a set of possible telephone numbers, has been entered by a call originator.

Optionally, processing element 305 may also be designed to determine an intended recipient, from among a set of recipients that are susceptible to receive a call over packet based connection 125. In a non-limiting example, the intended recipient of the call may be established based on the call destination data received over packet based connection 125, as discussed earlier. Alternatively, other information such as information on the call originator (e.g. telephone number, IP address, e-mail, etc. . . . ) may be used in addition to the call destination data. It is to be expressly understood that identifying an intended recipient is an optional step that can be dispensed with without departing from the spirit of the invention.

Figure 6:
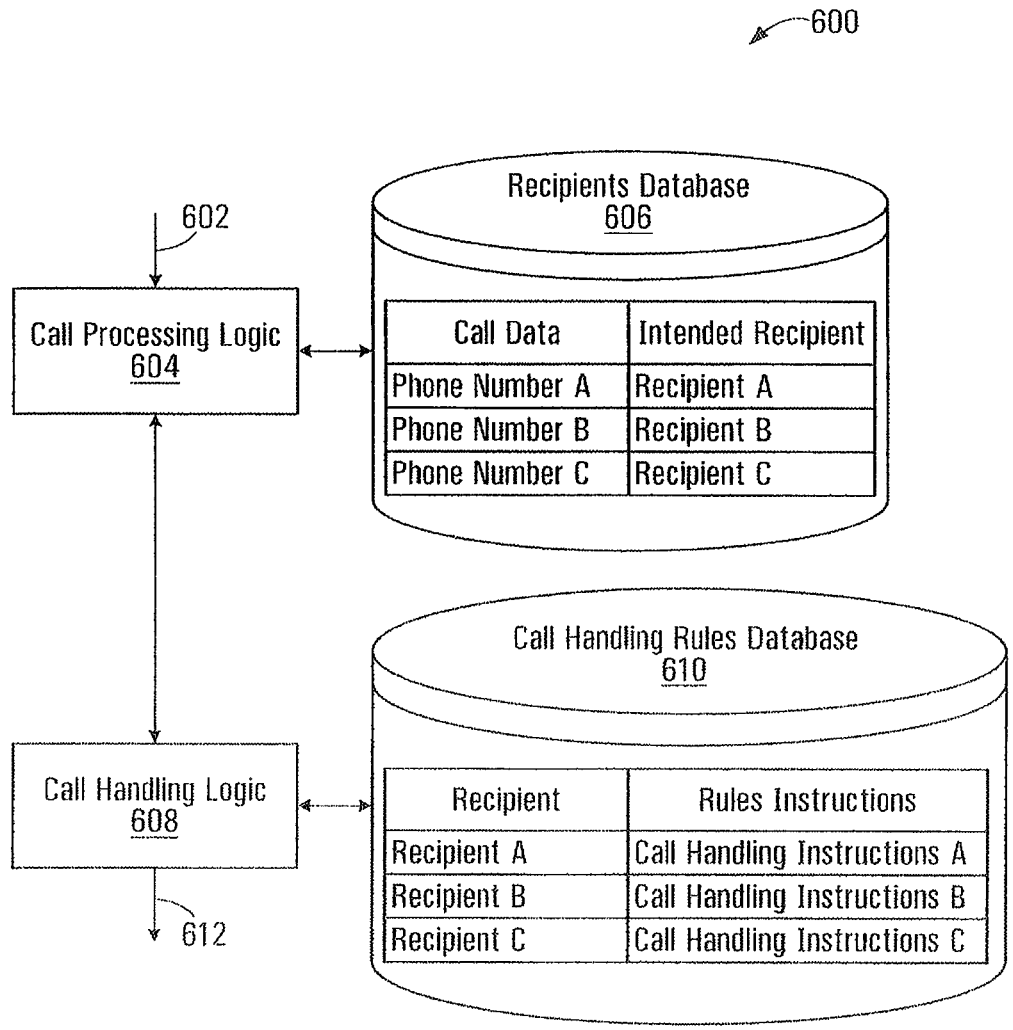
FIG. 6 is a functional block diagram of the processing element shown in FIG. 3, illustrating in greater detail components for performing call recipient identification In the drawings, embodiments of the invention are illustrated by way of example. It is to be expressly understood that the description and drawings are only for purposes of illustration and as an aid to understanding, and are not intended to be a definition of the limits of the invention.

Processing element 305 may optionally include a call initiation module 600 which performs the function of distinguishing call destination data and, optionally, an intended recipient and causing the call to be handled accordingly. A functional block diagram of a non-limiting example of implementation of the call initiation module 600 is shown in FIG. 6. It should be understood that the call initiation module 600 is only one component of the processing element 305. For clarity and conciseness, that is the only component that is being shown and described in connection with FIG. 6. Call initiation module 600 may be implemented by any suitable means and, in this non-limiting example, call initiation module 600 is implemented by software in the form of instructions stored on a computer-readable storage medium. Call initiation module could also be implemented using dedicated circuitry. Although call initiation module 600 has been described here as being a component of processing element 305, it should be understood that call initiation module 600 may lie partially or entirely outside processing element 305. For example, some or all of the functions of call initiation module 600 may be implemented in packet based interface 310 or may be implemented as a stand-alone element external to processing element 305.

In a non-limiting example, the call processing logic 604 of the call management module 600 receives at its input 602 call request information arriving over the packet based connection 125 and extracts call data that it is programmed to look for, including call destination data. In the example illustrated, call processing logic 604 is programmed to examine call request information and identify therein the telephone number that was dialed by the calling party. In the embodiment illustrated, the call initiation module 600 carries out the optional step of identifying a recipient. To this end, the different possible intended recipient information (telephone numbers in this example) may be stored in a recipients database 606 with which call processing logic 604 communicates. In this example, call processing logic matches call recipient information extracted with entries in the recipients' database 606 and retrieves therefrom an intended recipient's identity.

In this non-limiting example, once the intended call recipient has been identified, it is passed to call handling logic 608 (via call processing logic 604) which is responsible for determining how the call will be handled. Call handling logic 608 may be in communication with a call handling rules database 610 in which specific call handling instructions are associated with each potential recipient. Call handling logic 608 matches the intended recipient received from call processing logic 604 with its corresponding entry in call handling rules database 610 and obtains corresponding call handling instructions. In this exemplary embodiment call handling instructions are user-set rules stored as computer-readable instructions in a format suitable for causing call handling logic 608 to execute the instructions. Once call handling instructions are obtained, call handling logic 608 causes the call to be handled in accordance with the rules extracted from call handling rules database 610. Call handling instructions stored in database 610 can be dynamically altered by a user such that each intended recipient can decide how the call will be managed. The call handling rules can be customized via any suitable interface, such as through the handsets 110, via the interface 320 of the base station 105 or via other user interfaces as will be discussed later.

It is to be understood that the embodiment illustrated here is only exemplary, as it may not be necessary for databases 606 and 610 to be distinct. Indeed in an embodiment where the optional step of identifying an intended recipient is omitted, call initiation module may only have a single database wherein call destination data is mapped to call handling instructions. Also, while call processing logic 604 and call handling logic 608 are shown here as two separate entities, they may be combined into a single entity, e.g. in communication with a single database as described above. Of course, call initiation module and components thereof may be organized in any suitable way for achieving at base station 105 the functionality described herein.

Specific examples of call handling rules will be discussed below. In one example, the customer is a two-adult and two-child household and there are four potential recipients: a parent (office), both parents (personal), the children and a fax machine. Each of the four recipients may have their own telephone number. The customer premises 145 in this example is a household with an office, a recreational room, a living room, children's room and a parents' room. When a call request for the children is received, base station 105 analyzes the call request data, identifies the call destination data and, in this case, the intended recipient and obtains call handling instructions as described above.

A call handling rule may be setup to select to which handsets 110, from a set of handsets 110 at customer premises, the call will be directed. In a non-limiting embodiment, once a handset 110 is selected, base station 105 directs the call to the handset and causes it to ring. For example, if the destination data comprises the children's telephone number, the base station 105 can handle the call by causing the handsets 110 in the children's room and the recreational room to ring normally and display caller information (e.g. a caller identification), by causing the handsets 110 in the living room and in the parents' room to beep once and display caller information, and by causing the handset 110 in the office not to react (such that a parent working in the office does not get disturbed by the children's phone call).

In a non-limiting embodiment, once a call has been linked to a certain handset 110, the base station 105 may prevent other handsets 110 from ringing or may cause them to react (e.g. by ringing) in a different manner than the selected handset 110. In this fashion, the selected handset 110 may produce a first ring sound and the other handsets 110 may also ring but they may use a differern ring sound, such as to allow a user to audibly identify the handset 110 to which the call is directed.

Rules can also be set to determine how the call will be handled when no one answers the call, once the call has been routed to a certain handset 110. One possible example is to route the call to another handset 110, say the parents' handset 110. Optionally, if no one answers the handset to which the call is routed then the process may be repeated and the call may be routed to another handset 110 until all the handsets 110 have been exhausted. In this example, the call handling rules define the first handset 110 to which the call will be routed first, which is the one associated with the intended recipient and also define the order in which the remaining handsets 110 will be addressed. Of course, it is not necessary in such an embodiment for every handset 110 to be sequentially rung. For example, a plurality of handsets 110 may occupy the same place in the order (ring at the same time), and some handsets 110 may be absent from the order.

When no one answers the call, call handling rules can be set to determine how voice mail will be invoked. One simple case is to invoke a single voice mail box that is common to all recipients where a message can be left. Another option is to selectively invoke a voice mail system on the basis of the call destination data or the intended recipient. In the case where each call destination or intended recipient (except the fax machine) is associated with a distinct voice mail box within a voice mail system, each of the voice mail boxes may have their own voice prompt to invite the caller to leave a message. In this case, the call handling logic, upon identification of the call destination or intended recipient, will trigger the voice prompt associated with that call destination or recipient. When the voice prompt has been played and assuming the caller desires to leave a message, then the logic will enable the recording of a message from the calling party within the voice mail box associated with the call destination or intended recipient.

In yet another embodiment, there may be only one voice mail box but a plurality of voice prompts, each associated with a call destination or intended recipient. In this case, the voice prompt played could depend on the call destination data or the intended recipient but the voice mail message left by the call originator may be recorded within a common voice mail box. It is to be understood that the voice mail prompt may be any suitable prompt, and may or may not include a voice message. The voice mail prompt may include, for instance an audio cue without any utterance or speech. In another example, the voice mail prompt may be a message, either generic or recorded by a user, inviting a call originator to leave a voice mail message.

For clarity, each call destination or intended recipient may be associated with a voice mail service. Various voice mail services for various potential call destinations or intended recipients may be within a single voice mail system or distributed across voice mail systems. The differences between voice mail services may be the voice mail box to which the recorded message is stored, the voice mail prompt that is played to invite the caller to leave a message or both the voice mail box and the voice mail prompt. The voice mail services may be implemented within the base station 105, in another component within the customer premises (ex. computer 115) or a component outside the customer premises to which the base station 105 may direct the voice call.

Along with or instead of directing a handset 110 to ring to notify users of an incoming call, the processing element 305 may direct the handset 110 to which the call is being routed to display a visual incoming call alert. This visual incoming call alert may appear on the display 210 of the handset. One option is to display a text message indicating the identity of the intended recipient. The text message may be sent to handset 110 in any suitable manner and in one non-limiting embodiment, it is sent in the format used to send caller ID information. For example, base station 105 may replace caller line ID information received over connection 125 with a text message, such as the identity of the intended recipient extracted from the database 606, to be conveyed to the handset 110. Alternatively, base station 105 may keep all or portions of the caller line ID information and supplement it with additional information prior to forwarding it to the handset 110. Another possibility is to show an image or pictogram or even play a video clip that designates the intended call recipient. Note that the visual incoming call alert can also be provided in conjunction with a ring tone.

The visual incoming call alert can be particularly useful when a single handset 110 is being used with the base station 105. In such case, the visual incoming call alert may be displayed on the display 210 of the handset 110 to indicate the identity of the intended recipient. Note that, in some instances, the visual incoming call alert can be the only way for individuals in the customer premises 145 to distinguish the identity of the called party. For instance, when the ring function of the handset 110 has been muted or when a generic ring is used for all phone calls.

In a non-limiting embodiment, audio signals can be used as an indicator of a call destination or intended recipient. For example, the handset 110 selected by processing element 305 from the plurality of handsets 110 to which to link the call may be caused to ring in a different manner than other handsets. For example, it may be the only handset to ring or may ring with a different ring sound.

When call destination data or an intended recipient corresponds to a piece of equipment, such as a fax machine, the rules that are set can be such as to prevent any one of the handsets 110 to ring. Therefore, all the handsets 110 may remain silent and no one may be disturbed in the house when a fax is received. The fax machine may be connected into a phone jack and receive the ring tone and may answer normally after the predetermined number of rings. Alternatively, a fax machine may be caused to answer automatically any call destined to it by the base station 105, and therefore no rings needing to be emitted.

More sophisticated call handling rules can be implemented by taking into account other parameters such as temporal changes (time of day and date parameters). For instance, different call handling rules can be defined for different times of day or days of the week. For example, during day time when the children are at school, the call handling rules can stipulate that all the handsets 110 will ring when a call is received, irrespective of the call destination data or identity of the call recipient. However, after school hours, different call handling rules may apply such as to direct a call only to the children's room and/or the recreational room handsets 110 if the intended recipient is a child. As well, in the above example, calls intended to the parents may cause all handsets 110 to ring during the day time (e.g. when the children are at school) and cause only the handset in the parents' room to ring at night. Also, optionally, calls intended to the children may automatically be forwarded to voicemail during the daytime and cause the phone in the children's room and recreational room to ring in the afternoon.

Figure 4:
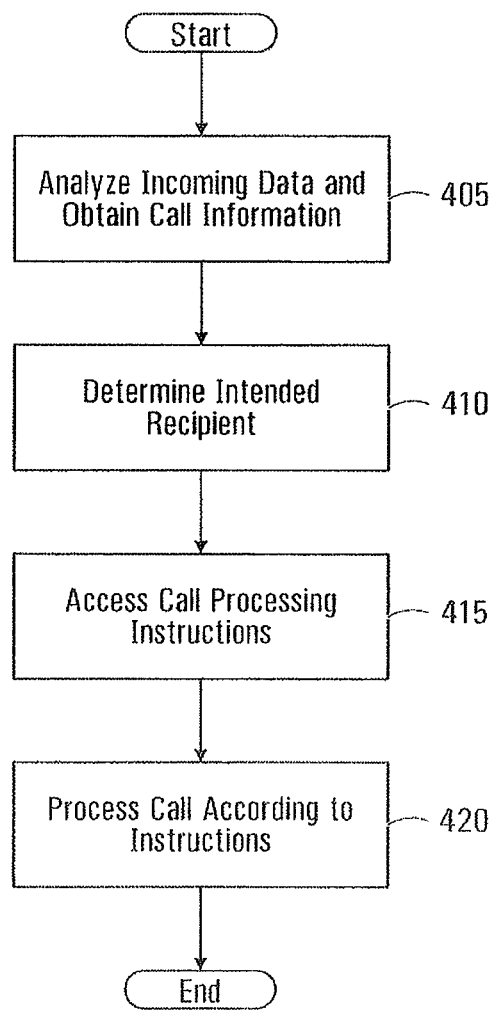
FIG. 4 is a flow chart depicting an exemplary operation of the base station of FIG. 3.

The behavior of base station 105 in the non-limiting embodiment described above can be broadly described as the four-step process illustrated in FIG. 4. Once a call request is received, at step 405, the incoming data is accepted and may be analyzed to obtain information pertaining to the call including call destination data. This may require collecting and combining packets, reading packet headers, or decoding encoded data.

Step 410 is an optional step. Here, the call information is analyzed to distinguish the intended call recipient from amongst other recipients that are susceptible to receive telephone calls through the VoIP connection. In this step, information contained in the call request data on the basis of which the intended recipient will be identified is extracted.

At step 415, the processing element 305 accesses instructions on how to handle the call. The instructions are at least in part related to the call destination data and may also be related to an intended recipient distinguished in step 410. In a non-limiting embodiment, every potential call destination (and optionally, intended recipient) has associated with it instructions on how to handle calls for it (there may be default instructions, for call destinations or recipient with no specified instructions). It is not necessary for the instructions to be constant. For example, there can be conditional instructions (e.g. ring children's handset only between 7 am-11 pm) or time-varying instructions (e.g. change my ring tone every day). These instructions can be kept in a table or elsewhere in memory and preferably can be changed by a user via user interface 320.

Finally, at step 420, the processing element 305 handles the call according to the instructions obtained at step 415. A large number of different ways of handling calls exist, any of which may be used. For example, at step 420, the base station may:
   cause a particular subset (one or more) of customer handsets 110 to ring for a predetermined amount of time (or rings);
   case of the above, and when no one has picked up the call, cause a second subset of customer handsets 110 to ring;
   cause one or more customer handsets to provide a visual indicator of the intended recipient when a call request is received; the visual indicator can be textual, graphical or both (e.g. display the name of the intended recipient, display a color or picture associated with recipient, etc.);
   cause one or more customer handsets 110 to provide an audio indicator of an intended recipient (e.g. play a ring tone associated with a recipient, speak out the intended recipient's name, etc.);
   cause the call to be forwarded to a particular voice mail box; or
   prevent a handset 110 that was not selected from ringing.

It is not necessary for base station 105 to always handle the call in accordance with the instructions obtained at step 415. External or other factors may cause an exception to the rule. For example, if a phone call is directed to one of the telephone numbers associated with the connection 125 while connection 125 is already in an active call, an additional call request could be sent by the network 140. In this case, the network 140 could provide call destination data for this additional call request based upon the specific telephone number that was dialed. When receiving the additional call request, the base station 105 may proceed with a similar process as discussed above with reference to FIG. 4. In particular, the base station 105 may detect the call destination data for the additional call request and, prior to or in parallel to conveying a call waiting indication to the handset(s) in the active call, determine the call handling rules to be applied for that particular call destination data (or the recipient associated with that particular call destination data). The call handling rules could include providing a visual indication of the intended recipient of the call and/or providing a distinctive audio indication on one or more handsets 110. This visual and/or audio indication may be directed to only one or more of the handset(s) 110 that are in the active call or could be provided to one or more other handsets 110. Alternatively, the call handling rules could comprise directing the incoming call to a voice mail system and, in particular, potentially to a specific voice mail box associated with the call destination data or intended recipient.

For example, if an incoming call is intended for the children in the above example, but the connection 125 is already in an active call, the caller may be provided a busy signal, be forwarded to a specific voice mail box based on the call destination data associated with the incoming call or be offered to the party on the active call using an audio and/or visual indication of the intended recipient.

In a non-limiting embodiment, the base station 105 may be suited for call-waiting functionality in which call requests arriving while another call is in progress are processed by emitting an alert, optionally different from a normal ring tone, to the user involved in the call that is in progress. The signal that conveys the call waiting request and that is received over the connection 125 may be processed as discussed in connection with the regular calls in order to distinguish call destination data. The call waiting request can be identified and a personalized call waiting alert generated on the basis of the performed identification. In a non-limiting example, the call waiting alert is a discrete beeping sound that is played by the speaker on the handset(s) 110 being used. However, any audible signal may be provided to the user on the handset 110 or a visual indicator may be displayed. The call waiting alert may be indicative of a call destination or recipient or of a call originator. Base station 105 may cause a call waiting alert to be dispatched to every handset 110 in use or alternatively may select a handset in any suitable way, for example using a database of call initiation module 600.

Although numerous options are provided for providing visual and/or audio indications to the handsets 110 in the above description, it should be noted that if an analog telephone is connected to base station 105 to be used as a handset 110, the analog telephone may not benefit from all the functionality likely found in other handsets such as wireless DECT handsets. Thus the handling options for the analog telephone may be limited to whether or not to ring and, perhaps, the ring tone that is utilized. In such a case, the limitations of the analog telephone may be taken into consideration by base station 105 when handling the call.

In the non-limiting embodiment described, base station 105 comprises a user interface 320. In an example, user interface 320 allows a user to change the settings of base station 105 such that incoming calls are handled differently. For example, in the optional case where the base station 105 maintains a list of potential recipients, a user may be able to add or remove recipients from a list of all the possible recipients at customer premises 145. A user may also be able to change the way the base station 105 determines whether an incoming call is intended for a recipient or set a default recipient.

The user may also be able to change the way calls are handled for each call destination or intended recipient, or change a default call handling. For example, a user may be permitted to enter via user interface 320 new routing information associated with a call destination such as a telephone number. The user may therefore be able to set which handset 110 is selected by base station 105 when a call request is received with a certain call destination data. A user may also access other information such as the contact list (add, delete, modify entries) via user interface 320. In certain embodiments, user interface 320 may also be used for more technical activities such as adding an additional handset 110 to be connected to the base station or setting quality of service preferences.

Although the user interface 320 has been shown here uniquely as part of base station 105, it may be partially, or entirely, contained elsewhere. For example, some or all of the user interface functions may be provided to a user at a handset 110 via handset connection 125. Alternatively, a computer 115, in communication with base station 105 may be used to access user interface functions. The computer acting as user interface 320 may be directly linked to base station 105 via LAN connection 135 or may be connected via the Internet (e.g. user interface 320 could be a web page).

Figure 5:
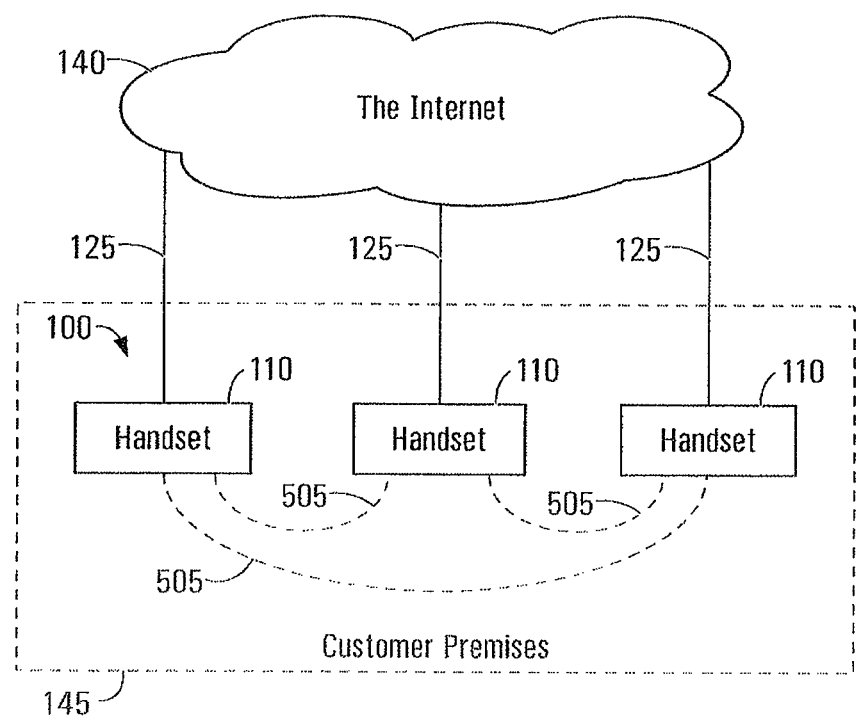
FIG. 5 is a block diagram of a customer premises telephony system in accordance to a variant.

Although the system 100 has been depicted here as a centralized system with base station 105 having most of the intelligence, one skilled in the art will appreciate that the system 100 may be distributed, with one or more of the handsets 110 performing any one or more of the steps illustrated in FIG. 4. Thus base station 105 may be entirely absent, as is the case in FIG. 5 where each handset 110 is connected directly to the internet via a common packet based connection 125. In this and the previous embodiment, it may be necessary, if there is a plurality of handsets 110, for the handsets 110 to communicate with one another such as to ensure consistent call handling. To this end, handsets 110 may be connected to one another via handset-to-handset connections 505. In a non-limiting embodiment, handset-to-handset connections 505 are peer-to-peer connections.

Alternatively, a base station 105 may only be responsible for depacketizing incoming data and obtaining information pertaining to an incoming call (step 405) and forwarding it to handsets 110, the handsets 110 being responsible for steps 410, 415 and 420. In this case, handsets 110 each receive the information indicative of an intended recipient contained in a call request and based on that information, decide how to handle the call. For example, a handset in the parents' room will receive information contained in a call request for a call intended for the children and will decide not to ring but only to beep and display the caller ID. In this non-limiting embodiment, upon receiving a call request the handsets 110 may communicate with one another, either through base station 105 or via a handset-to-handset connection 505 to establish at which handset(s) 110 the call is to be picked up. Thus, even though there is no centralized intelligence dictating how to handle the call, handsets 110 can ensure that every call causes at least one handset 110 to ring, and that all handsets 110 handle calls in a consistent manner.

While in FIG. 4, operations have been shown in the form of discrete steps, it is to be appreciated that steps 405, 410, 415 and 420 may be combined, or rearranged in any suitable order with departing from the intended scope of the invention. Optional step 410 may or may not be present.

Although the present invention has been illustrated here in the context of packet based telephony, it is to be understood that it could also be practice with circuit-switched telephony or in any other telephony system, for example by obtaining call destination data from analog ring tones impressed on a twisted pair connection with a PSTN network.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for processing voice calls directed to a connection leading to a customer premises, the method comprising:
   a) receiving at the customer premises a signal over the connection carrying a call request indicative of an incoming voice call, wherein the call request includes call destination data conveying a call destination identifier;
   b) distinguishing an intended recipient of the voice call from among a plurality of recipients susceptible to receive a voice call over the connection at least in part based on information contained in the call destination data;
   c) causing the voice call to be forwarded to a single voice mail box that is common to the plurality of recipients, the single voice mail box having a plurality of voice prompts, each of the voice prompts being associated with a respective one of the plurality of recipients; and
   d) playing one voice prompt of the plurality of voice prompts associated with the single voice mail box, wherein the one voice prompt that is played is determined based on the call destination data included in the call request.

2. A method as defined in claim 1, wherein the connection is a packet based connection for carrying packet based call requests indicative of incoming packet based voice calls.

3. A method as defined in claim 2, wherein the incoming packet based voice call is a VoIP call.

4. A method as defined in claim 1, wherein the call destination identifier includes a telephone number.

5. A method as defined in claim 1, wherein the call destination identifier includes an e-mail address.

6. A method as defined in claim 1, wherein the call destination identifier includes an IP address.

7. A telephone system, comprising:
   a) a set of handsets at a customer premises;
   b) a base station at a customer premises having:
      i) an input for connection to a connection leading to a customer premises, wherein the connection is capable of carrying voice calls; and
      ii) an input interface to receive a signal over the connection carrying a call request indicative of an incoming voice call, wherein the call request includes call destination data conveying a call destination identifier;
   c) a voice mail box that is common to a plurality of recipients; and
   d) a processing element at a customer premises coupled to the input interface for:
      i) distinguishing an intended recipient of the voice call from among a plurality of recipients susceptible to receiving a voice call over the connection at least in part based on information contained in the call destination data;
      ii) forwarding the incoming voice call to a single voice mail box that is common to the plurality of recipients, the single voice mail box having a plurality of voice prompts, each of the voice prompts being associated with a respective one of the plurality of recipients; and
      iii) playing one voice prompt of the plurality of voice prompts associated with the single voice mail box, wherein the one voice prompt that is played is determined based on the call destination data included in the call request.

8. A telephony system as defined in claim 7, wherein the connection is a packet based connection for carrying packet based call requests indicative of incoming packet based voice calls.

9. A telephony system as defined in claim 7, wherein:
   d) the voice call is conveyed over the connection according to a first signal format;
   e) the voice call is conveyed to the selected voice mail service according to a second signal format; and
   f) the processing element further for performing translation of the voice call from the first format to the second format.

10. A telephone system as defined in claim 7, wherein the processing element is located in the base station.

11. A telephone system as defined in claim 7, wherein the voice mail services are located in the base station.

12. A telephone system as defined in claim 8, wherein the incoming packet based voice call is a VoIP call.

13. A telephone system as defined in claim 7, wherein the call destination identifier includes a telephone number.

14. A telephone system as defined in claim 7, wherein the call destination identifier includes an e-mail address.

15. A telephone system as defined in claim 7, wherein the call destination identifier includes an IP address.

16. A telephone system as defined in claim 7, wherein the voice mail services are associated with respective voice mail prompts inviting an originator of a voice call to leave a voice mail message, the forwarding including playing to the originator of the incoming voice call a voice mail prompt associated with the voice mail service selected among the set of voice mail services.

* * * * *